(12) United States Patent
Muramatsu

(10) Patent No.: US 8,397,600 B2
(45) Date of Patent: Mar. 19, 2013

(54) MULTI-FUNCTIONAL FEED-SCREW-TYPE DOVETAIL STAGE

(75) Inventor: Hiroaki Muramatsu, Hachioji (JP)

(73) Assignee: Miruc Optical Co., Ltd. (JP)

( * ) Notice: Subject to any disclaimer, the term of this patent is extended or adjusted under 35 U.S.C. 154(b) by 410 days.

(21) Appl. No.: 12/730,666

(22) Filed: Mar. 24, 2010

(65) Prior Publication Data

US 2011/0017009 A1    Jan. 27, 2011

(30) Foreign Application Priority Data

Jul. 27, 2009   (JP) .................................. 2009-173855

(51) Int. Cl.
G05G 11/00 (2006.01)
F16H 3/06 (2006.01)
F16H 27/02 (2006.01)
F16H 29/02 (2006.01)
F16H 29/20 (2006.01)

(52) U.S. Cl. ................................... 74/490.09; 74/89.45
(58) Field of Classification Search .................. 74/89.45, 74/89.23, 89.33, 490.09, 490.11
See application file for complete search history.

(56) References Cited

U.S. PATENT DOCUMENTS

| | | | | |
|---|---|---|---|---|
| 2,323,010 A | * | 6/1943 | Walter | ............................. 483/26 |
| 2,755,682 A | * | 7/1956 | Boyd | ............................. 74/89.45 |
| 2,910,779 A | | 11/1959 | Patton | |
| 3,067,521 A | | 12/1962 | Platt | |
| 3,221,841 A | * | 12/1965 | Kraklau, Jr. | ................. 188/72.7 |

FOREIGN PATENT DOCUMENTS

| | | |
|---|---|---|
| DE | 195 04 884 A1 | 8/1995 |
| DE | 295 16 807 U1 | 12/1995 |
| DE | 29 700 712 U1 | 2/1997 |
| DE | 198 04 238 A1 | 8/1999 |
| DE | 10 2006 027 523 A1 | 1/2008 |
| JP | 56-33259 A | 4/1981 |
| JP | 3-72147 U | 7/1991 |
| JP | 4-136705 A | 5/1992 |
| JP | 6-645 U | 1/1994 |
| JP | 6-3929 U | 1/1994 |
| JP | 2000-220715 A | 8/2000 |
| JP | 2006-21283 A | 1/2006 |
| JP | 4267054 B1 | 2/2009 |

OTHER PUBLICATIONS

Notice of Grounds for Rejection issued for Japanese Patent Application No. 2009-173855 mailed Dec. 8, 2009 with English translation.

(Continued)

*Primary Examiner* — Justin Krause
(74) *Attorney, Agent, or Firm* — Cantor Colburn LLP

(57) ABSTRACT

A multi-functional feed-screw-type dovetail stage may include a male threaded rod having, on each of its ends, a coupling portion for coupling to a control knob; a first support and a second support provided on respective sides of a fixed member for rotatably supporting the male-threaded rod; and the control knob that detachably couples via its coupling portion to the male-threaded rod and serves to rotate the male-threaded rod. A slide member travels until a female-threaded cylinder engaging the fixed member abuts the first support and the second support upon moving.

7 Claims, 10 Drawing Sheets

OTHER PUBLICATIONS

Cleveland Präzisionssysteme GmbH: Positioning systems from the Black Forest, Catalogue Löffingen/Germany, Sep. 2008. 3.1-3.10.—Company literature http://www.cleveland.de/pdfs/Katalog/Cleveland-Katalog_gesamt_web.pdf [retrieved on Nov. 28, 2011].

Indunorm Bewegungstechnik GmbH: Spindle axis Series LT. D-47249 Duisburg, Aug. 17, 2006 (Date of last change in pdf File)—Company literature http://www.indunorm.eu/media/LT.pdf [retrieved on Nov. 28, 2011].

Examination Report for German Patent Application 10 2010 015 995.6, dated Nov. 28, 2011, with English translation.

Notification of Reasons for Refusal for Taiwanese Patent Application No. 99108173, dated Jul. 11, 2012, with English translation.

Taiwanese Office Action for Taiwanese Patent Application 099108173, mailed Dec. 17, 2013, with English translation.

* cited by examiner

A—A

B—B

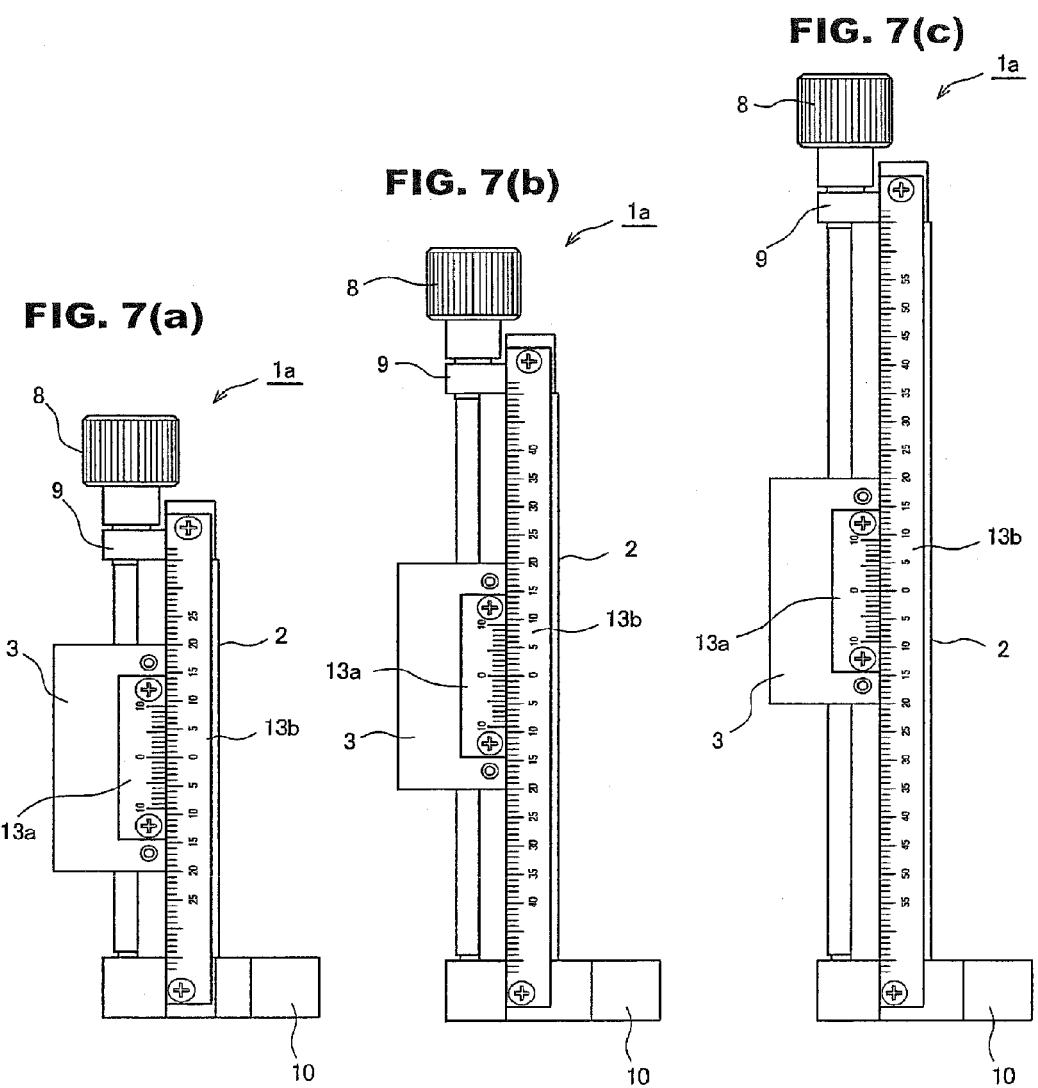

MULTI-FUNCTIONAL FEED-SCREW-TYPE DOVETAIL STAGE

CROSS-REFERENCE TO RELATED APPLICATIONS

The entire disclosure of Japanese Patent Application No. 2009-173855 including specification, claims, drawings, and abstract is incorporated herein by reference.

BACKGROUND OF INVENTION

1. Field of Invention

The present invention relates to a multi-functional feed-screw-type dovetail stage. More particularly, the present invention relates to a feed-screw-type dovetail stage in which a slide member having a female-threaded cylinder connected thereto is engaged with a fixed member having a male-threaded rod connected thereto, and, by operating a control knob to rotate the male-threaded rod so as to move the female-threaded cylinder, the slide member is made to slide to thereby perform positional adjustment of a precision apparatus mounted on the stage.

2. Description of Related Art

When installing precision apparatuses, such as electric or electronic devices including CCD cameras and sensors, optical devices including lenses and microscopes, and illumination devices including LEDs, positional adjustment must be performed in order to determine proper positioning and to achieve focus. Further, after installation in position, additional fine positional adjustments may become necessary.

Such precision apparatuses are often mounted on a device called a "dovetail stage" and subjected to positional adjustment. In a typical structure of a dovetail stage, a slide member for mounting an apparatus thereon is coupled, by means of a slide mechanism, to a fixed member secured to a base, and, by manually operating a control knob, the slide member is made to slide with respect to the fixed member. There are various formats of such a dovetail stage provided for different purposes of use. For example, a dovetail stage may be an X-axis dovetail stage that slides in one direction, an XY-axis dovetail stage that slides in two substantially orthogonal directions, a Z-axis dovetail stage that slides along the vertical direction, or a rotary stage that slides in rotation. Further, depending on the incorporated drive system, a dovetail stage may be, for example, a feed-screw-type dovetail stage that is driven by a feed screw, or a rack-and-pinion-gear-type dovetail stage that is driven by a rack and pinion gear.

FIGS. 9(a)-9(c) show a conventional feed-screw-type dovetail stage. FIG. 9(b) shows a side view of a feed-screw-type dovetail stage 100. FIG. 9(a) shows a plan view of the structure of FIG. 9(b) as viewed in the direction indicated by G-G. FIG. 9(c) is a plan view of the structure of FIG. 9(b) as viewed in the direction indicated by H-H. The feed-screw-type dovetail stage 100 is composed of a slide member 103 having a dovetail 104, a fixed member 102 having a dovetail groove 105, a male-threaded rod 107 and a female-threaded cylinder 106 constituting the slide mechanism, a control knob 108, and a slide lock screw 112. A scale plate 113b is provided on the slide member 103 side, while a scale plate 113a is provided on the fixed member 102 side. By engaging the male-threaded rod 107 with the female-threaded cylinder 106 and rotating the control knob 108, the slide member 103 slides with respect to the fixed member 102. The slide lock screw 112 serves to lock the slide member 103 with respect to the fixed member 102 at an arbitrary position.

The male-threaded rod 107 of the feed-screw-type dovetail stage 100 has a cantilever structure, with one end being mounted and attached to the fixed member 102 and the other end being a free end. In the feed-screw-type dovetail stage 100, the range of travel of the slide member 103 with respect to the fixed member 102 is defined by abutment of the female-threaded cylinder 106 against a stopper plate 109 attached to one end of the fixed member 102 and a washer 110 provided at the other end of the fixed member 102. The male-threaded rod 107 constitutes an integral part of the feed-screw-type dovetail stage 100, and therefore cannot be replaced. Further, owing to the mechanism of the feed-screw-type dovetail stage 100, the positions of the control knob 108 and the scale plates 113a, 113b are fixed.

A rotary stage having a rotary table that rotates with respect to a base is also conventionally known. In a rotary stage, a feed screw is provided on one of the rotary table or the base, while a nut that screws onto the feed screw is provided on the other component. By means of this feed screw mechanism, the rotary table rotates in both forward and reverse directions with respect to the base.

In a conventional feed-screw-type dovetail stage, the male-threaded rod has a cantilever structure with one end being fixed and the other end being a free end, such that the male-threaded rod has a larger deflection toward its tip due to its own weight. Accordingly, distorted engagement may be generated between the female-threaded cylinder and the male-threaded rod as the length of the female-threaded cylinder becomes longer, possibly resulting in degraded performance of the feed-screw-type dovetail stage.

Furthermore, the male-threaded rod and the control knob are provided in a fixed manner and constitute an integral part of the feed-screw-type dovetail stage product. Accordingly, a user cannot replace the male-threaded rod, such that the stage has very limited functionality.

Moreover, as the positions of the control knob, slide lock screw, and scale plates are fixed in the product, those positions cannot be changed. Also, the structure of the stage does not permit a user to select the travel range of the slide member from a variety of different ranges. Therefore, a conventional stage has poor usability for the user.

SUMMARY OF INVENTION

The present invention provides a multi-functional feed-screw-type dovetail stage in which a slide member having a female-threaded cylinder connected thereto is engaged with a fixed member having a male-threaded rod connected thereto, and, by operating a control knob to rotate the male-threaded rod so as to move the female-threaded cylinder, the slide member is made to slide to thereby perform positional adjustment of a precision apparatus mounted on the stage. The male-threaded rod includes, on each of its ends, a coupling portion for coupling to the control knob. The multi-functional feed-screw-type dovetail stage further comprises a first support and a second support provided on respective sides of the fixed member, the supports defining the length of the fixed member along a travel direction of the female-threaded cylinder and rotatably supporting the male-threaded rod. Further, the control knob detachably couples via its coupling portion to the male-threaded rod and serves to rotate the male-threaded rod.

According to the above-described structure, the male-threaded rod is configured as a simple beam supported by the first support and the second support. As a result, the amount of deflection of the male-threaded rod is reduced, such that distorted engagement between the female-threaded cylinder and the male-threaded rod is minimized, enabling improved performance of the feed-screw-type dovetail stage. Further, as the control knob can be coupled to either end of the male-threaded rod, usability can be easily improved in accordance with the purpose of use. In addition, as the length of the fixed member along the travel direction of the female-threaded cylinder is defined by the distance between the first support and the second support, the feed-screw-type dovetail stage can be provided with a variety of different travel ranges in accordance with the purpose of use.

In the multi-functional feed-screw-type dovetail stage, the coupling portion preferably comprises threaded holes formed in the respective ends of the male-threaded rod along an axial direction, and a bolt inserted inside the control knob along the axial direction for engaging with the threaded holes formed in the male-threaded rod. The slide member preferably includes an insertion recess in which a protrusion coupled to the female-threaded cylinder can be removably inserted. The multi-functional feed-screw-type dovetail stage is preferably configured such that, by removing the engaged bolt and removing the protrusion from the insertion recess, replacement can be made selectively from among a plurality of male-threaded rods having different amounts of displacement per rotation and their corresponding female-threaded cylinders. By configuring as above, selections for replacement can be made from among a plurality of male-threaded rods having different amounts of displacement per rotation and their corresponding female-threaded cylinders, facilitating improvement of usability of the multi-functional feed-screw-type dovetail stage. Furthermore, as the control knob can be coupled to either end of the male-threaded rod, usability can be easily improved in accordance with the purpose of use.

In the multi-functional feed-screw-type dovetail stage, the slide member preferably comprises projections each having an inverted triangle shape in a cross-section that intersects the travel direction of the slide member, and longitudinal grooves provided for forming the projections. The multi-functional feed-screw-type dovetail stage is preferably configured such that, by screwing a slide lock screw into a slide lock screw hole that penetrates to the projection so as to abut the projection, the projection is inclined toward the opposing fixed member, thereby securing the slide member with respect to the fixed member. With this arrangement, in accordance with the purpose of use, the slide lock screw can be provided on either of the two side surfaces or on both side surfaces simultaneously, enabling easy improvement of usability.

In the multi-functional feed-screw-type dovetail stage, the scale plates and the slide lock screw for securing the slide member in position with respect to the fixed member are preferably provided on both side surfaces of the slide member that are located in a direction that intersects the travel direction of the slide member. With this arrangement, the slide lock screw and the scale plates can be provided on a side surface in accordance with the purpose of use, enabling easy improvement of usability.

In the multi-functional feed-screw-type dovetail stage, the male-threaded rod is preferably coupled to a first control knob and a second control knob at the first support and the second support, respectively. With this arrangement, the control knobs can be coupled simultaneously to both ends of the male-threaded rod, enabling easy improvement of the control knob operation in accordance with the purpose of use.

The multi-functional feed-screw-type dovetail stage is preferably configurable such that the male-threaded rod is directed toward a substantially vertical direction, the first support is secured to a base, and the second support is coupled to the control knob. With this arrangement, the multi-functional feed-screw-type dovetail stage can be used in the vertical direction, enabling easy improvement of usability in accordance with the purpose of use.

In the multi-functional feed-screw-type dovetail stage, a plurality of slide members may preferably be arranged with respect to one fixed member in parallel along the slide direction. Further, in the multi-functional feed-screw-type dovetail stage, a plurality of pairs each including a fixed member and a slide member may preferably be connected and arranged in parallel along the slide direction. With these arrangements, a plurality of slide members can be provided at one location in parallel so that a plurality of slide members can be selected and used in accordance with the purpose of use, enabling easy improvement of usability.

In the multi-functional feed-screw-type dovetail stage, the plurality of slide members arranged in parallel differ from one another in at least one of control knob position, amount of displacement per rotation of the male-threaded rod, and maximum travel distance. With this arrangement, it is possible to provide a plurality of slide members arranged in one location with varying control knob positions, varying amounts of displacement per rotation of the male-threaded rod, and varying maximum travel distances.

BRIEF DESCRIPTION OF THE DRAWINGS

FIGS. 7(a)-7(c) show front views of the multi-functional feed-screw-type dovetail stage of FIG. 6(a) with varying measurement ranges.

DESCRIPTION OF THE PREFERRED EMBODIMENTS

Embodiments of the multi-functional feed-screw type dovetail stage according to the present invention are described in detail below by reference to the drawings.

Figure 1A:
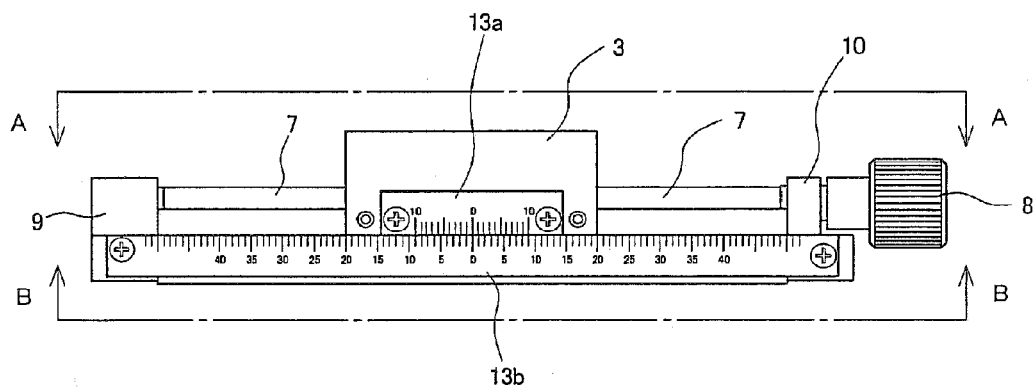
FIG. 1(a) is a front view showing a schematic structure of an embodiment of a multi-functional feed-screw-type dovetail stage according to the present invention.
Figure 1B:
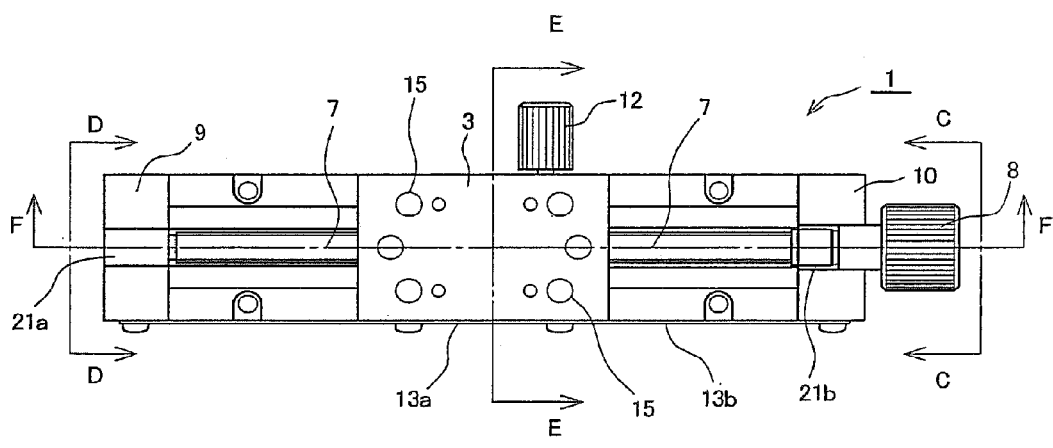
FIG. 1(b) is a plan view showing the schematic structure of the embodiment of the multi-functional feed-screw-type dovetail stage according to the present invention, as viewed in the direction indicated by A-A in FIG. 1(a).
Figure 1C:
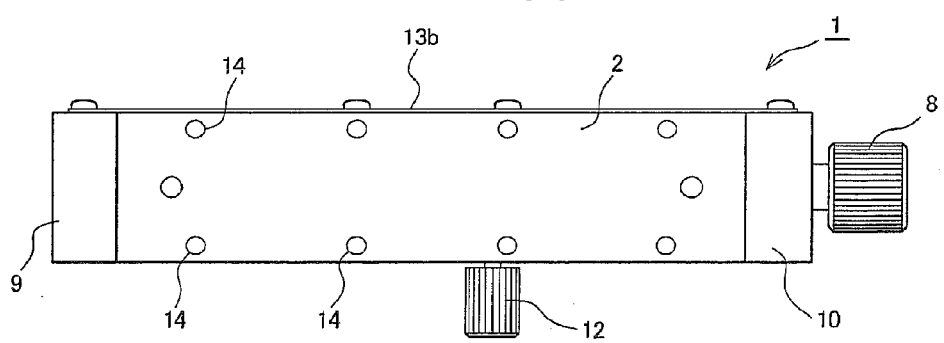
FIG. 1(c) is a bottom view showing the schematic structure of the embodiment of the multi-functional feed-screw-type dovetail stage according to the present invention, as viewed in the direction indicated by B-B in FIG. 1(a).
Figure 2A:
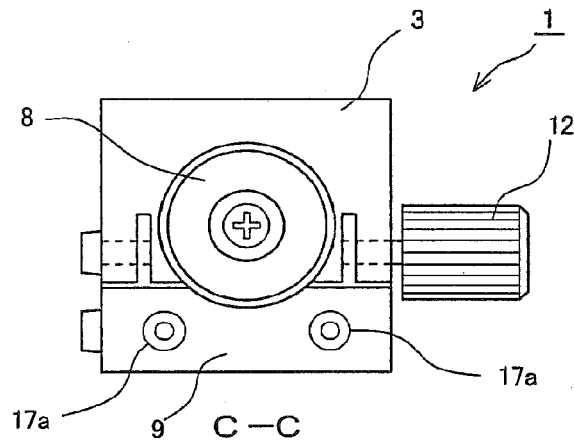
FIG. 2(a) shows a side view of the multi-functional feed-screw-type dovetail stage, as viewed in the direction indicated by C-C in FIG. 1(b).
Figure 2B:
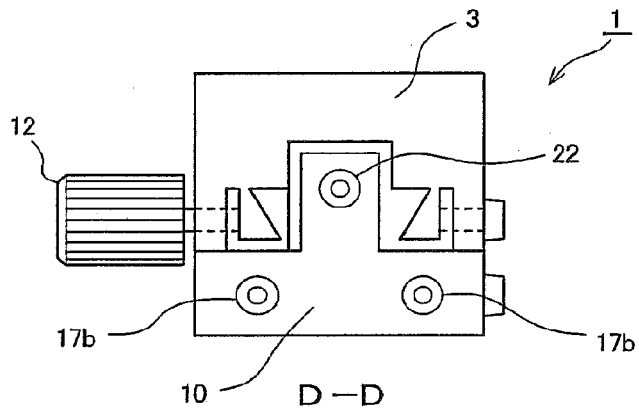
FIG. 2(b) shows a side view of the multi-functional feed-screw-type dovetail stage, as viewed in the direction indicated by D-D in FIG. 1(b).
Figure 2C:
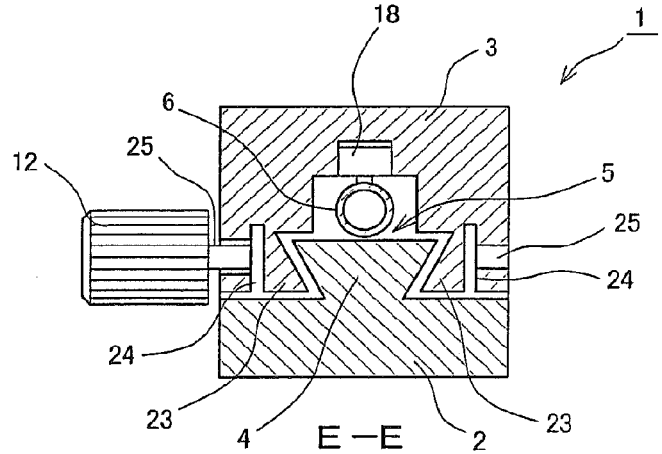
FIG. 2(c) shows a cross-sectional view of the multi-functional feed-screw-type dovetail stage, as viewed in the direction indicated by E-E in FIG. 1(b).
Figure 3:
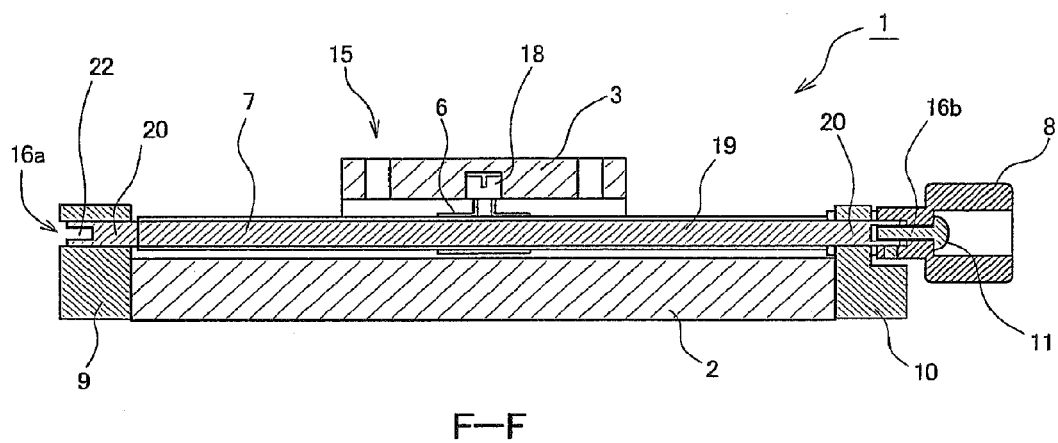
FIG. 3 shows a cross-sectional view of the multi-functional feed-screw-type dovetail stage, as viewed in the direction indicated by F-F in FIG. 1(b).

FIGS. 1(a)-1(c), 2(a)-2(c), and 3 show schematic structural views of an embodiment of the multi-functional feed-screw-type dovetail stage according to the present invention. FIG. 1(a) shows a front view of the multi-functional feed-screw-type dovetail stage 1. FIG. 1(b) shows a plan view as viewed in the direction indicated by A-A in FIG. 1(a), and FIG. 1(c) shows a bottom view as viewed in the direction indicated by B-B in FIG. 1(a). FIG. 2(a) shows a side view as viewed in the direction indicated by C-C in FIG. 1(b), FIG. 2(b) shows a side view as viewed in the direction indicated by D-D in FIG. 1(b), and FIG. 2(c) shows a cross-sectional view taken along E-E in FIG. 1(b). Further, FIG. 3 shows a cross-sectional view taken along F-F in FIG. 1(b). The multi-functional feed-screw-type dovetail stage 1 includes a fixed member 2, a slide member 3, a female-threaded cylinder 6, a male-threaded rod 7, a control knob 8, a first support 9, a second support 10, and a bolt 11 for control knob connection.

Referring to FIG. 1(b), a precision apparatus (not shown) is secured to the multi-functional feed-screw-type dovetail stage 1 by bolts (not shown) inserted into holes 15 created in the slide member 3 for mounting a precision apparatus. Further, referring to FIG. 1(c), the multi-functional feed-screw-type dovetail stage 1 is fastened to a base (not shown) by bolts (not shown) inserted into holes 14 created in the fixed member 2 for fixedly fastening to the base.

As shown in FIG. 3, in the multi-functional feed-screw-type dovetail stage 1, the female-threaded cylinder 6 is secured to the slide member 3 by inserting a protrusion 18 provided on the female-threaded cylinder 6 into an insertion recess 26 provided in the slide member 3. This protrusion 18 is removably inserted into the insertion recess 26. The female-threaded cylinder 6 is formed by providing female threading on the inside of a cylinder, which engages with male threading provided on the male-threaded rod 7. By performing a rotating operation of the control knob 8 to rotate the male-threaded rod 7, the female-threaded cylinder 6 is moved along the left and right directions in FIG. 3. In this manner, the slide member 3 is made to slide with respect to the fixed member 2, to thereby adjust the position of the mounted precision apparatus (not shown). Further, by means of a scale plate 13a attached to the slide member 3 and a scale plate 13b attached to the fixed member 2, the amount of travel of the slide member 3 with respect to the fixed member 2 is measured.

As shown in FIG. 3, the fixed member 2 is abutted on its respective ends by the first support 9 and the second support 10. The first support 9 and the second support 10 are secured to the fixed member 2 via support-securing bolts 17a, 17b, respectively, as shown in FIGS. 2(a) and 2(b).

The coupling portion for coupling the control knob 8 and the male-threaded rod 7 is next explained. The coupling portion is configured with holes 16a, 16b for control knob connection and the bolt 11 for control knob connection. The male-threaded rod 7 is composed of a central threaded section 19 that engages the female-threaded cylinder 6, and round rod sections 20 without threading. As shown in FIG. 3, the holes 16a, 16b for control knob connection are formed along the axial direction in the round rod sections 20 of the male-threaded rod 7. As shown in FIG. 1(b), the round rod sections 20 of the male-threaded rod 7 are inserted into through-holes 21a, 21b formed in the first support 9 and the second support 10, respectively, for receiving the male-threaded rod therethrough. In this manner, the male-threaded rod 7 is rotatably supported by the first support 9 and the second support 10. In other words, the male-threaded rod 7 functions as a simple beam supported at its respective ends by the first support 9 and the second support 10. This arrangement reduces the amount of deflection of the male-threaded rod 7. As a result, distorted engagement between the threads of the female-threaded cylinder 6 and the male-threaded rod 7 is minimized, enabling enhancement of the performance of the multi-functional feed-screw-type dovetail stage 1.

The control knob 8 has integrated therein the bolt 11 for control knob connection that engages the holes 16a, 16b for control knob connection formed in the male-threaded rod 7. By causing the bolt 11 for control knob connection to engage either of the holes 16a, 16b for control knob connection, the control knob 8 can be coupled to the multi-functional feed-screw-type dovetail stage 1. Using the coupled control knob 8, the male-threaded rod 7 is rotated.

Figure 4A:
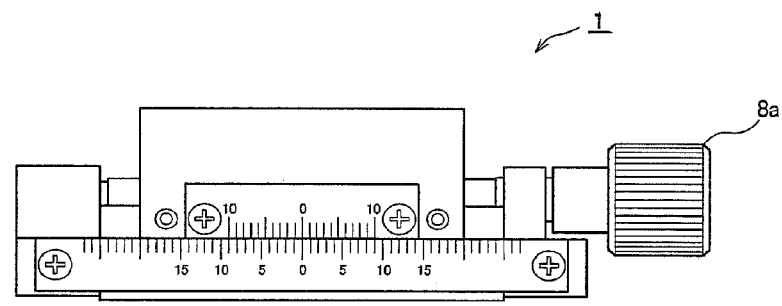
FIGS. 4(a)-4(c) show front views with varying control knob mounting positions.
Figure 4B:
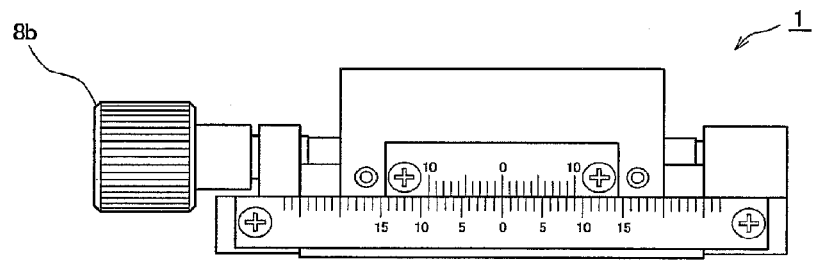
Figure 4C:
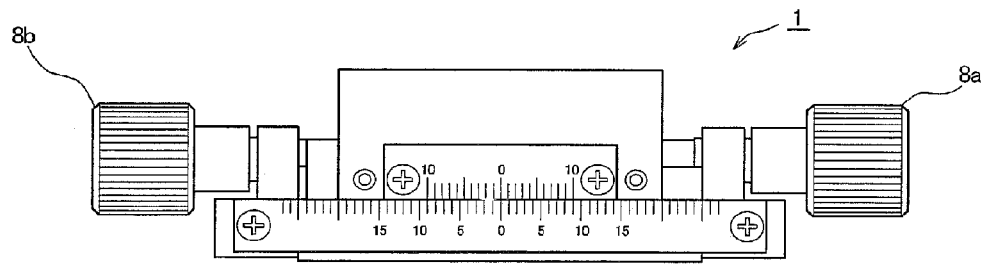
Figure 5A:
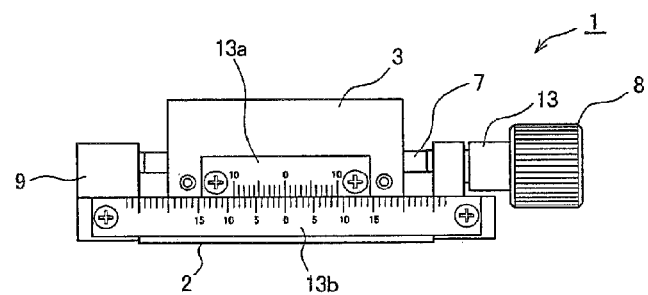
FIGS. 5(a)-5(d) show front views of a first modified example of the multi-functional feed-screw-type dovetail stage, with varying measurement ranges.
Figure 5B:
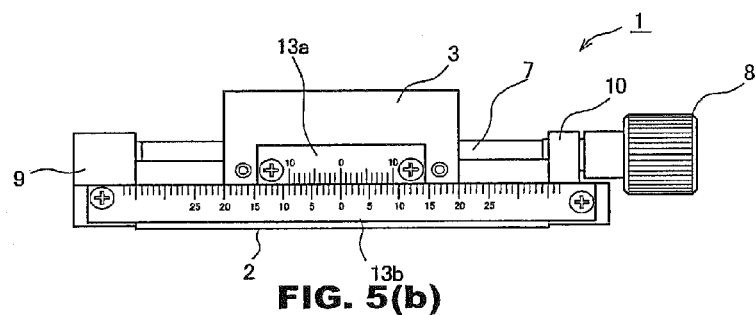
Figure 5C:
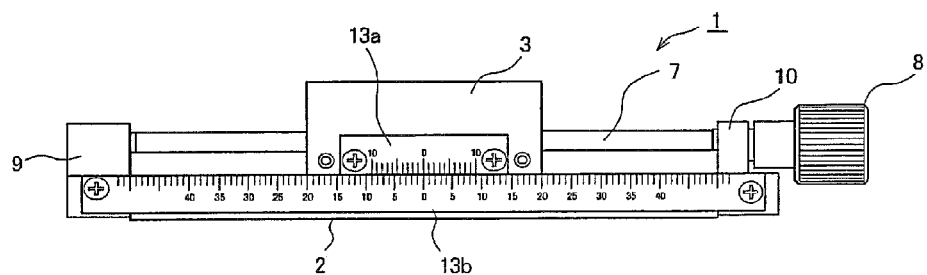
Figure 5D:
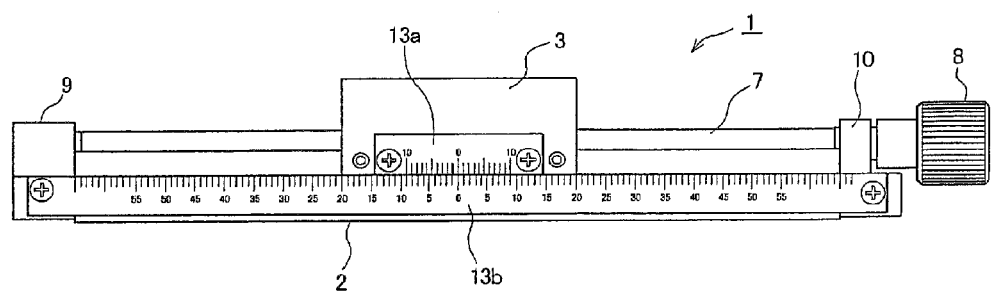

FIGS. 4(a)-4(c) show various mounting positions for the control knob 8. FIG. 4(a) is a front view showing the control knob 8a in the position shown in FIG. 3. FIG. 4(b) is a front view showing the control knob 8b being coupled to the opposite side. FIG. 4(c) is a front view showing the control knobs 8a, 8b being simultaneously coupled to the respective sides. The control knobs 8a, 8b can be freely detached from the male-threaded rod 7 by loosening and removing the bolt 11 for control knob connection. Although the bolt 11 for control knob connection is engaged in the hole 16b for control knob connection in FIG. 3, the bolt 11 may be removed therefrom and instead engaged in the hole 16a for control knob connection. As shown in FIG. 3, a blank bolt 22 is inserted in the hole 16a for control knob connection at which the control knob 8 is not provided.

As described above, the control knob 8 is freely attached to and detached from the male-threaded rod 7 by means of the bolt 11 for control knob connection. Accordingly, by removing the bolt 11 for control knob connection engaged in the hole 16a or 16b for control knob connection, replacement can be made selectively from among a plurality of male-threaded rods 7. For example, the amount of displacement per rotation of a standard male-threaded rod 7 may be 5 mm, and optional male-threaded rods 7 may have different amounts of displacement per rotation, such as 2 mm and 10 mm. Selections and replacements can be made from among these options in accordance with convenience of use. As described above, as the female-threaded cylinder 6 corresponding to the male-threaded rod 7 is configured such that its protrusion 18 can be removably inserted in the insertion recess 26 provided in the slide member 3, the female-threaded cylinder 6 can be replaced in a pair with the male-threaded rod 7.

FIGS. 5(a)-5(d) show varying measurement ranges, as a first modified example of the multi-functional feed-screw-type dovetail stage 1. The slide member 3 is able to travel until the female-threaded cylinder 6 abuts the first support 9 and the second support 10 upon moving. Accordingly, by changing the axial length of the fixed member 2 interposed between the first support 9 and the second support 10, a stage product can be provided in accordance with convenience of use. Further, because the male-threaded rod 7 is supported at its respective ends by the first support 9 and the second support 10, favorable performance can be attained even when the male-threaded rod 7 is made longer.

As shown in FIG. 2(c), in the multi-functional feed-screw-type dovetail stage 1, the slide member 3 having a dovetail groove 5 receding in a shape of a trapezoid is movably fitted to the fixed member 2 having a dovetail 4 projecting in a shape of a trapezoid. The slide member 3 includes projections 23 each having an inverted triangle shape in a cross-section that intersects the travel direction of the slide member 3, longitudinal grooves 24 provided for forming the projections 23, and slide lock screw holes 25 penetrating to the grooves 24. The slide lock screw 12 is screwed into the slide lock screw hole 25 and is abutted against the projection 23. The projection 23 is inclined inward toward the fixed member 2 to press against the dovetail 4, thereby securing the slide member 3 with respect to the fixed member 2. As the slide lock screw holes 25 are provided on both side surfaces of the slide member 3 that are located in the direction that intersects the travel direction of the slide member 3, the slide lock screw 12 can be provided on either of the two side surfaces. Similarly, regarding the scale plates 13a, 13b, because holes (not shown) for fastening the scale plates are provided on both side surfaces of the slide member 3 that are located in the direction that intersects the travel direction of the slide member 3, the scale plates 13a, 13b can be provided on either of the two side surfaces.

Figure 6A:
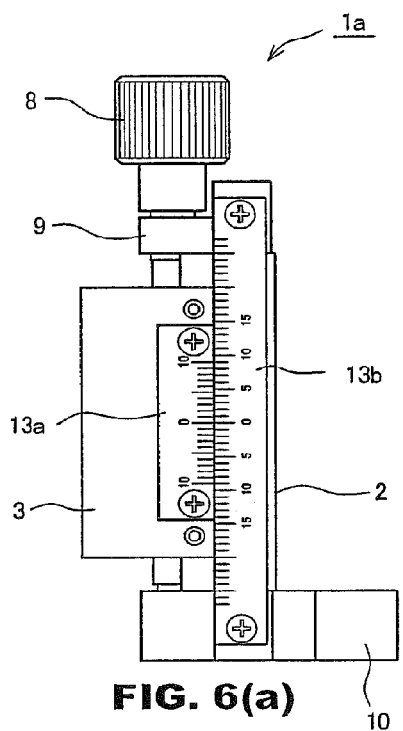
FIG. 6(a) is a front view showing, as a second modified example of the multi-functional feed-screw-type dovetail stage, a multi-functional feed-screw-type dovetail stage that moves a precision apparatus along a Z-axis direction (vertical direction).
Figure 6B:
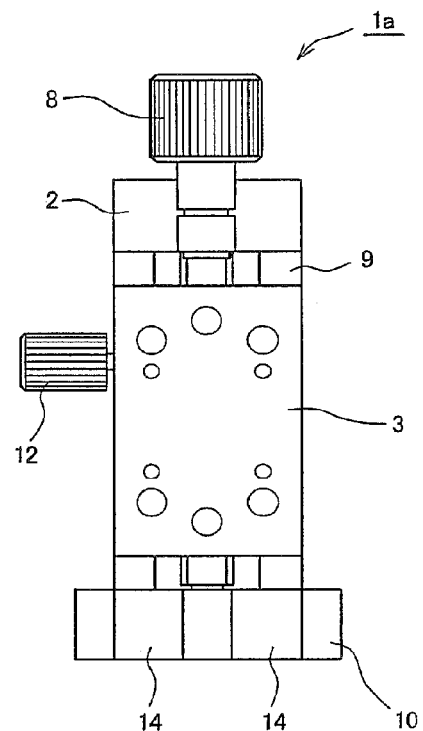
FIG. 6(b) is a side view showing, as the second modified example of the multi-functional feed-screw-type dovetail stage, a multi-functional feed-screw-type dovetail stage that moves a precision apparatus along the Z-axis direction (vertical direction).
Figure 6C:
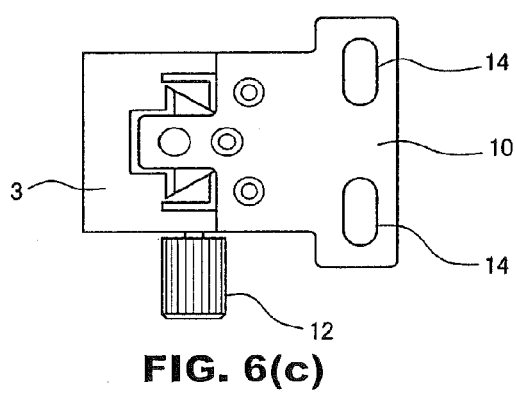
FIG. 6(c) is a bottom view showing, as the second modified example of the multi-functional feed-screw-type dovetail stage, a multi-functional feed-screw-type dovetail stage that moves a precision apparatus along the Z-axis direction (vertical direction).

FIGS. 6(a)-6(c) show, as a second modified example of the multi-functional feed-screw-type dovetail stage 1, a multi-functional feed-screw-type dovetail stage 1a that moves the precision apparatus (not shown) along the Z-axis direction (substantially vertical direction). In this example, the male-threaded rod 7 is directed toward the substantially vertical direction. The second support 10 includes holes 14 for fixedly fastening to the base, and is secured to the base (not shown) by means of bolts (not shown). Further, the first support 9 has the control knob 8 connected thereto. In other words, by replacing either the first support 9 or the second support 10 of the multi-functional feed-screw-type dovetail stage 1 with a component having the holes 14 for fixedly fastening to the base, the stage can be configured as the multi-functional feed-screw-type dovetail stage 1a that moves along the Z-axis direction.

FIGS. 7(a)-7(c) show examples of the multi-functional feed-screw-type dovetail stage 1a with varying measurement ranges. The slide member 3 is able to travel until the female-threaded cylinder 6 abuts the first support 9 and the second support 10 upon moving. Accordingly, by changing the axial length of the fixed member 2 interposed between the first support 9 and the second support 10, a stage product can be provided in accordance with applications. Further, because the male-threaded rod 7 is supported on its respective ends by the first support 9 and the second support 10, favorable performance can be attained even when the length of the male-threaded rod 7 is made longer.

Figure 8A:
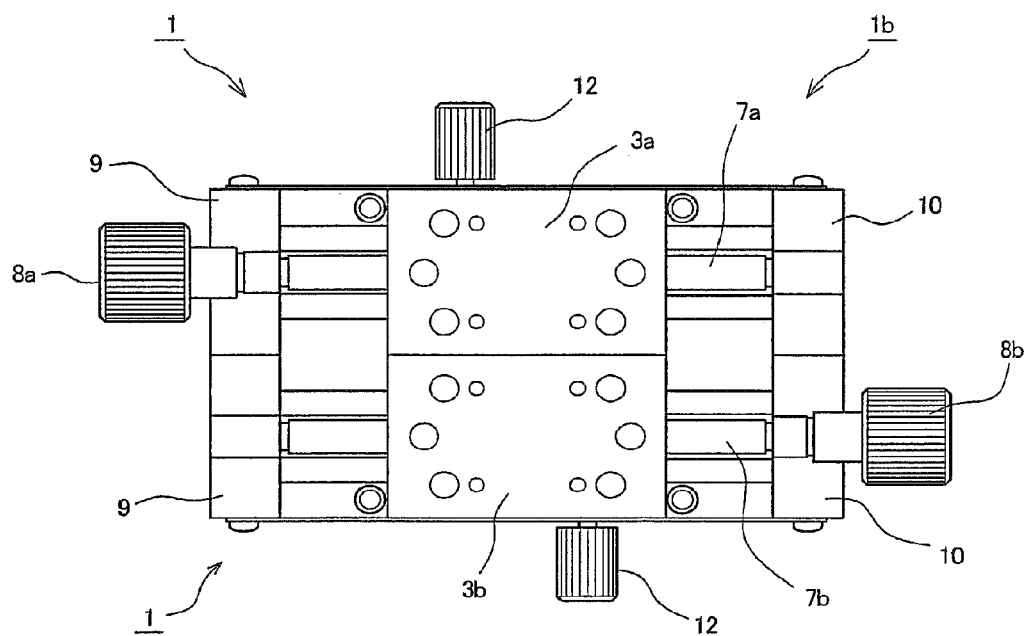
FIG. 8(a) is a plan view showing, as a third modified example of the multi-functional feed-screw-type dovetail stage, a multi-functional feed-screw-type dovetail stage including a plurality of slide members arranged in parallel.
Figure 8B:
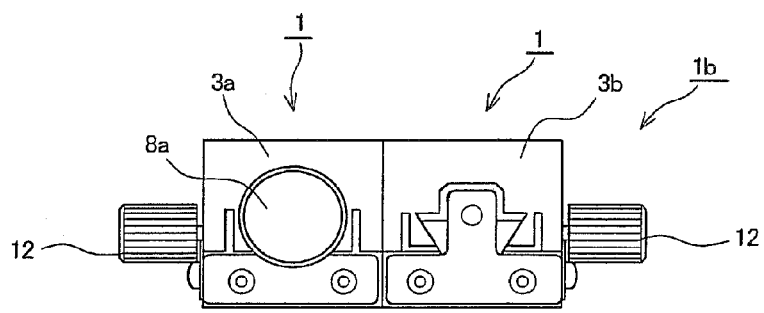
FIG. 8(b) is a side view showing, as the third modified example of the multi-functional feed-screw-type dovetail stage, a multi-functional feed-screw-type dovetail stage including a plurality of slide members arranged in parallel.
Figure 9A:
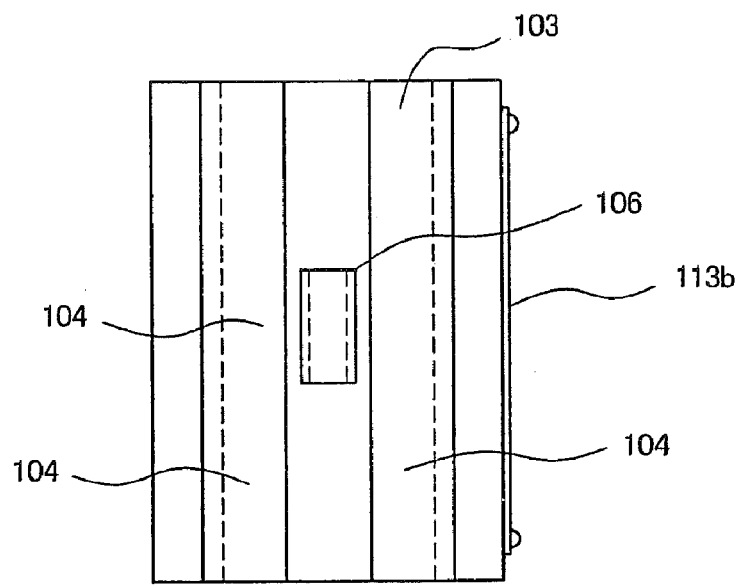
FIG. 9(a) shows a plan view of a conventional feed-screw-type dovetail stage, as viewed in the direction indicated by G-G in FIG. 9(b).
Figure 9B:
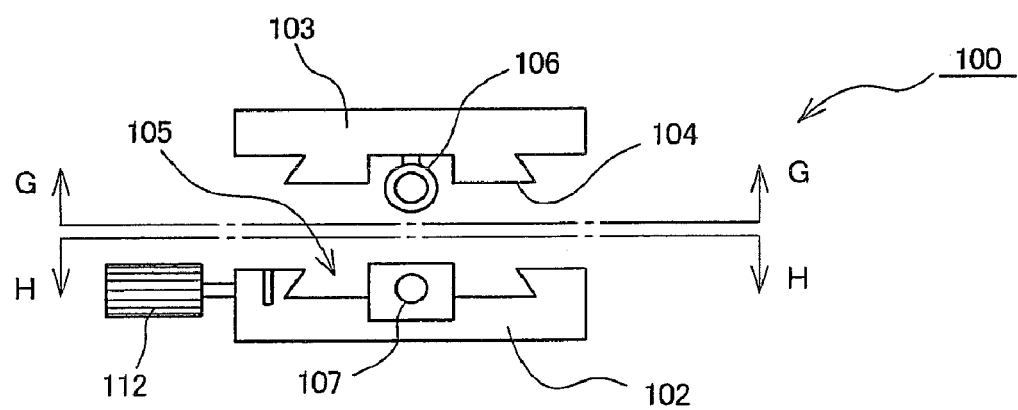
FIG. 9(b) shows a cross-sectional view of the conventional feed-screw-type dovetail stage.
Figure 9C:
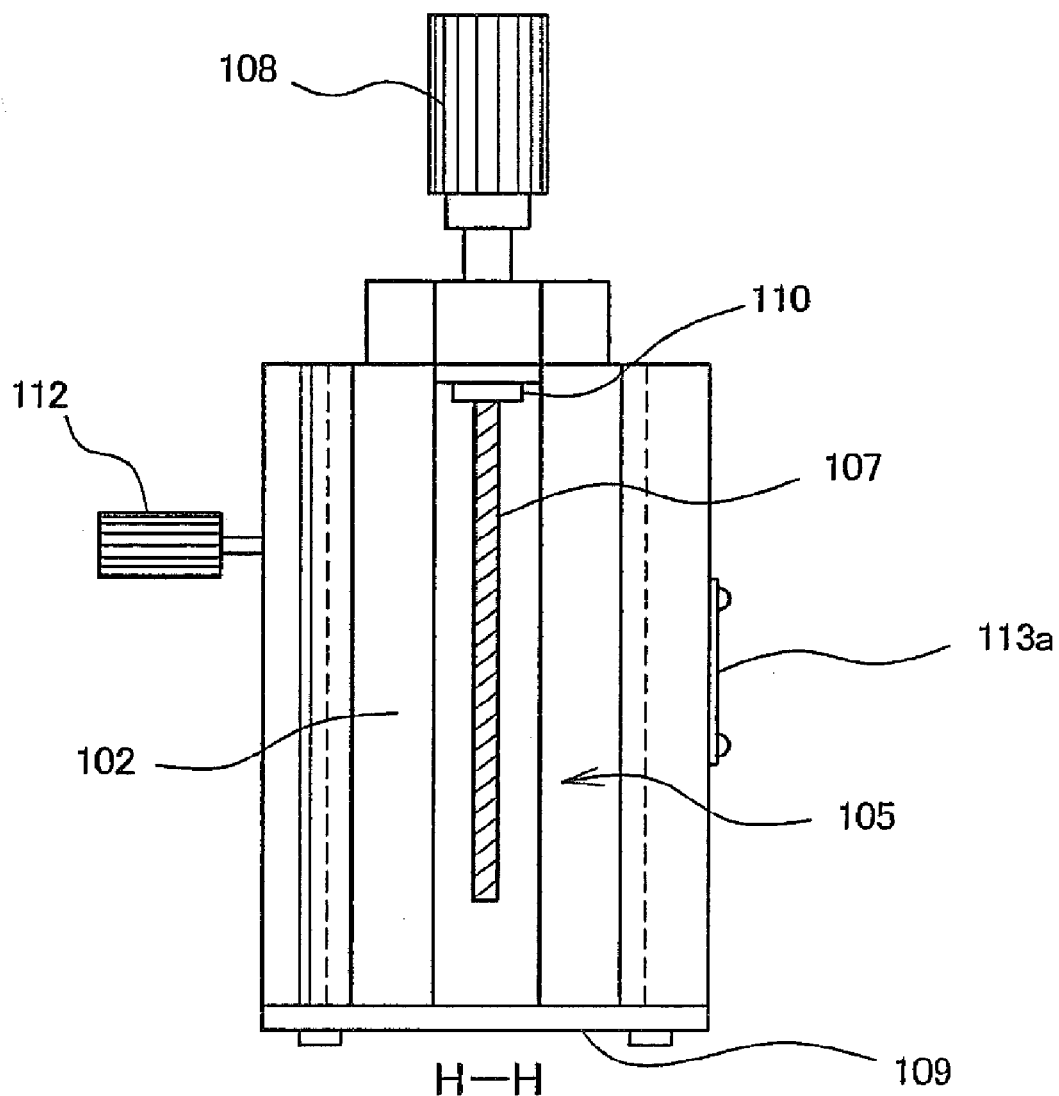
FIG. 9(c) shows a plan view of a conventional feed-screw-type dovetail stage, as viewed in the direction indicated by H-H in FIG. 9(b).

FIGS. 8(a) and 8(b) show, as a third modified example of the multi-functional feed-screw-type dovetail stage, a multi-functional feed-screw-type dovetail stage 1b in which a plurality of pairs each including a fixed member 2 and a slide member 3 are connected and arranged in parallel along the slide direction. FIG. 8(a) shows a plan view, while FIG. 8(b) shows a side view thereof. In this example, one pair including a fixed member 2a and a slide member 3a, and another pair including a fixed member 2b and a slide member 3b are arranged in parallel along the slide direction. These two pairs arranged in parallel differ from each other in at least one of control knob 8 position, amount of displacement per rotation of the male-threaded rod 7, and maximum travel distance. For example, in FIG. 8(a), the control knobs 8a, 8b are attached at opposite locations. Further, by varying the amount of displacement per rotation between the male-threaded rods 7a and 7b, the slide members 3a and 3b for fixating the precision apparatus (not shown) thereon can be selectively used.

According to the third modified example of the multi-functional feed-screw-type dovetail stage 1, a plurality of slide members 3 may be arranged in parallel along the slide direction with respect to one fixed member 2. In other words, the one fixed member 2 serves as the base for carrying a plurality of slide members 3a and 3b.

The invention claimed is:

1. A multi-functional feed-screw dovetail stage in which a slide member having a female-threaded cylinder connected thereto is engaged with a fixed member having a male-threaded rod connected thereto, and, by operating a control knob to rotate the male-threaded rod so as to move the female-threaded cylinder, the slide member is made to slide to thereby perform positional adjustment of a measuring equipment mounted on the stage,
    wherein
    the male-threaded rod includes, on each of its respective ends, a rod coupling portion for coupling to a knob coupling portion of the control knob;
    the multi-functional feed-screw dovetail stage further comprises a first support and a second support provided on respective sides of the fixed member, the supports defining the length of the fixed member along a travel direction of the female-threaded cylinder and rotatably supporting the male-threaded rod;
    the control knob detachably couples via the knob coupling portion to the male-threaded rod and serves to rotate the male-threaded rod;
    the rod coupling portion comprises threaded holes formed in the two ends of the male-threaded rod along an axial direction, and a bolt inserted inside the control knob along the axial direction for engaging with the threaded holes formed in the male-threaded rod;
    the slide member includes an insertion recess in which a protrusion coupled to the female-threaded cylinder can be removably inserted; and
    by removing the engaged bolt and removing the protrusion from the insertion recess, replacements can be made selectively from among a plurality of male-threaded rods having different amounts of displacement per rotation and corresponding female-threaded cylinders.

2. The multi-functional feed-screw-type dovetail stage according to claim 1, wherein scale plates and the slide lock screw for securing the slide member in position with respect to the fixed member are provided on respective side surfaces of the slide member that are located in a direction that intersects the travel direction of the slide member.

3. The multi-functional feed-screw-type dovetail stage according to claim 1, wherein
the male-threaded rod is coupled to a first control knob and a second control knob at the first support and the second support, respectively.

4. The multi-functional feed-screw-type dovetail stage according to claim 1, wherein
the male threaded screw is directed toward a substantially vertical direction,
the first support is secured to a base, and
the second support is coupled to the control knob.

5. The multi-functional feed-screw-type dovetail stage according to claim 1, wherein
a plurality of slide members are arranged with respect to one fixed member in parallel along the slide direction.

6. The multi-functional feed-screw-type dovetail stage according to claim 1, wherein
a plurality of pairs each including a fixed member and a slide member are connected and arranged in parallel along the slide direction.

7. The multi-functional feed-screw-type dovetail stage according to claim 5, wherein
the plurality of slide members arranged in parallel differ from one another in at least one of control knob position, amount of displacement per rotation of the male threaded rod, and maximum travel distance.

* * * * *